United States Patent [19]
Attaway et al.

[11] Patent Number: 5,302,285
[45] Date of Patent: Apr. 12, 1994

[54] PROPELLANT WASTEWATER TREATMENT PROCESS

[75] Inventors: Hubert Attaway; Mark D. Smith, both of Panama City, Fla.

[73] Assignee: The United States of America as represented by the Secretary of the Air Force, Washington, D.C.

[21] Appl. No.: 128,005

[22] Filed: Sep. 20, 1993

[51] Int. Cl.$^5$ .............................. C02F 3/30; C02F 1/58
[52] U.S. Cl. .................... 210/605; 210/611; 210/612
[58] Field of Search .................. 210/605, 610–612, 210/614, 630, 631, 742, 743, 903

[56] References Cited

U.S. PATENT DOCUMENTS

| | | | |
|---|---|---|---|
| 3,105,014 | 9/1963 | Harrison | 195/3 |
| 3,145,166 | 8/1964 | Howe | 210/16 |
| 3,634,226 | 1/1972 | Witt et al. | 210/11 |
| 3,755,156 | 8/1973 | Yakovlev et al. | 210/5 |
| 3,756,947 | 9/1973 | Fujii et al. | 210/11 |
| 3,943,055 | 3/1976 | Korenkov et al. | 210/2 |
| 3,979,283 | 9/1976 | Prudom | 210/11 |
| 4,211,647 | 7/1980 | Friedman et al. | 210/17 |
| 4,662,893 | 5/1987 | McIntosh | 210/174 |
| 4,756,832 | 7/1988 | Gold et al. | 210/632 |
| 5,133,877 | 7/1992 | Roter et al. | 210/761 |

OTHER PUBLICATIONS

"Anaerobic Wastewater Treatment" in *Advances in Engineering/Biotechnology*, #29, A. Fiechter Ed. Springer-Verlag pp. 83–115 (1984).
*Wastewater Engineering*, Metcalf-Eddy Inc., McGraw-Hill, Chaps 10 and 12 (1972).
*Bacterial Metabolism*, G Gottschalk, Chap 8 "Bacterial-Fermentations".

Primary Examiner—Thomas Wyse
Attorney, Agent, or Firm—Bobby D. Scearce; Thomas L. Kundert

[57] ABSTRACT

A method for treatment and disposal of propellant wastewater, soil washwaters or groundwaters having dissolved perchlorate salts is described, which comprises adding to the contaminated water in an anaerobic reactor a mixed bacterial culture containing a specific bacterium, HAP1, which uses perchlorate as its terminal electron acceptor and thus reduces the perchlorate ion to chloride in the water; maintaining the proper nutrient and environmental conditions for HAP1 to optimally reduce perchlorate in the water and discharging effluent wastewater from the anaerobic reactor to an aerobic reactor and maintaining proper nutrient and environmental conditions for the optimal conversion of soluble organics to carbon dioxide and sludge and reduction of BOD, COD, ammonia and odor in the effluent water.

15 Claims, 4 Drawing Sheets

PROPELLANT WASTEWATER TREATMENT PROCESS

RIGHTS OF THE GOVERNMENT

The invention described herein may be manufactured and used by or for the Government of the United States for all governmental purposes without the payment of any royalty.

BACKGROUND OF THE INVENTION

The present invention relates to methods for biologically treating wastewater, groundwater and soil washwater contaminated with ammonium perchlorate based rocket propellants, and specifically to an economical and environmentally safe method for treatment and disposal of process wastewater containing explosive materials such as may be generated from the manufacture, maintenance, refurbishment and disposition of solid propellant rocket motors and the remediation of groundwater or soil washwater contaminated with perchlorate based material.

Existing methods for disposal of ammonium perchlorate based solid rocket propellants consist generally of open burning/open detonation of the fuel or of static firing of the fueled rocket motor. Disposal by open burning or detonation is performed in an open pit where the propellant burns in an uncontrolled manner and may explode and spread in the area immediately surrounding the burn site. This exploded material serves as a contamination point for soil and groundwater. Static firing of a rocket motor produces the same concentration of exhaust gases as are produced during a normal launch. In either disposal procedure, hydrogen chloride gas is produced at a rate of about 0.2 pound per pound of burned propellant, and nitrogen oxides and various hydrocarbons are also produced. Open burning or detonation of the propellant or static firing of the fueled rocket may therefore be considered environmentally unacceptable.

The invention solves or substantially reduces in critical importance problems in the related prior art by providing a two stage anaerobic-aerobic process for the biological reduction of wastewater containing ammonium perchlorate which may be generated from the manufacture, maintenance, refurbishment and disposition of Class 1.1 and 1.3 rocket motors or the remediation of soils an groundwaters contaminated with said materials. Class 1.1 rocket motor propellants typically contain 14% ammonium perchlorate, 14% HMX and 30% nitroglycerine as oxidizers, 20% aluminum fuel and 22% nitrocellulose binder. Class 1.3 propellants typically contain 70% ammonium perchlorate oxidizer, 17% aluminum fuel and 13% PBAN binder. Wastewater is generated from rocket motor washout operations in which propellant is removed from the motor casing with high pressure water. For class 1.3 propellants, about 7550 gallons of liquid containing about 10% by weight of ammonium perchlorate normally are produced per 10,000 pounds of propellant. Wastewater treatment according to the invention comprises reducing perchlorate to chloride in a first stage anaerobic reactor using a specific unique microorganism in a mixed culture under controlled pH and temperature conditions, followed by reduction in a second stage aerobic reactor of the organics produced in the anaerobic reactor. The effluent liquid may be disposed of routinely to a conventional sanitary sewer system.

Known in the art is a method for biochemical reduction of chromium or chlorine inorganic oxygen containing compounds in industrial wastewaters (U.S. Pat. No. 3,755,156). The process involves the mixing of said wastewaters with municipal sewage whose biological oxygen demand (BOD) exceeds the amount of oxygen in the inorganic chromium and chlorine oxides. The combined wastewaters, municipal sewage and recycled acclimated sludge are maintained under anaerobic conditions with the bioreduction of perchlorates occurring at volumetric rates of approximately 12 mg $ClO_4^-$/hr per liter. The treated wastewater is then passed to an aeration chamber for the further reduction of BOD.

Also known in the art is the controlled addition of the micro-organism Vibrio dechloraticans Cuznesove B-1168 to a similar mixture of perchlorate or chlorate bearing industrial wastewater and municipal sewage with bioreduction of those compounds to chloride salts (U.S. Pat. No. 3,943,055). This process increases the volumetric bioreduction rate of perchlorate to over 100 mg/hr per liter compared to the previous method and improves the specific perchlorate degradation rate to 70 mg $ClO_4^-$/hr per gram of biomass solids.

The invention has advantages over the prior art in that, (1) it can reduce perchlorate wastewater concentrations as high as 7750 mg per liter, a 26 fold increase over previous methods; (2) the organism used (HAP1) has a specific degradation rate of at least 1492 mg $ClO_4^-$/hr per gram of dry biomass, a 21-fold increase over previous methods; (3) it has a demonstrated continuous volumetric degradation rate at least two-fold higher (221 mg $ClO_4^-$/hr liter) than previous methods at ten-fold higher perchlorate concentrations (3000 mg/liter); (4) it provides a self-contained optimum nutrient feed system and thus does not require a municipal sewage source for operation. This is a requirement for the operation of this type of system in remote demilitarization processes and contaminated soil and groundwater sites.

It is a principal object of the present invention to provide a method for treating and disposing of wastewater containing perchlorate-based explosive materials.

It is another object of the invention to provide an economical and environmentally safe process for the biotreatment of perchlorate wherever desired, including, but not limited to, rocket motor washout systems, contaminated demilitarization facilities, contaminated soils or contaminated groundwater.

A further object of the invention is to provide a unique microorganism capable of degrading perchlorate at rates and concentrations significantly higher than reported in the prior art.

These and other objects of the invention will become apparent as a detailed description of representative embodiments proceeds.

SUMMARY OF THE INVENTION

In accordance with the foregoing principles and objects of the invention, a method for treatment and disposal of propellant wastewaters, soil washwaters or groundwaters having dissolved perchlorate salts is described, which comprises adding to the contaminated water in an anaerobic reactor a mixed bacterial culture containing a specific bacterium, HAP1, which uses perchlorate as its terminal electron acceptor and thus reduces the perchlorate ion to chloride in the water;

maintaining the proper nutrient and environmental conditions for HAP1 to optimally reduce perchlorate in the water; and discharging effluent wastewater from the anaerobic reactor to an aerobic reactor and maintaining proper nutrient and environmental conditions for the optimal conversion of soluble organics to carbon dioxide and sludge and reduction of BOD, COD, ammonia and odor in the effluent water.

DESCRIPTION OF THE DRAWINGS

The invention will be more clearly understood from the following detailed description of representative embodiments thereof read in conjunction with the accompanying drawings wherein.

DETAILED DESCRIPTION

The invention comprises (1) a specific organism (HAP1) added in a mixed bacterial culture to perchlorate bearing wastewaters in (2) an anaerobic/aerobic bioreactor system with defined environmental and nutrient operating conditions to provide for optimum biotreatment of the wastewaters. The following two-part description details both components.

THE BACTERIUM HAP1

The perchlorate reducing organism HAP1 of the invention has the general characteristics, carbon substrate range, and electron acceptor range set forth respectively in Tables I, II, and III.

Figure 1:
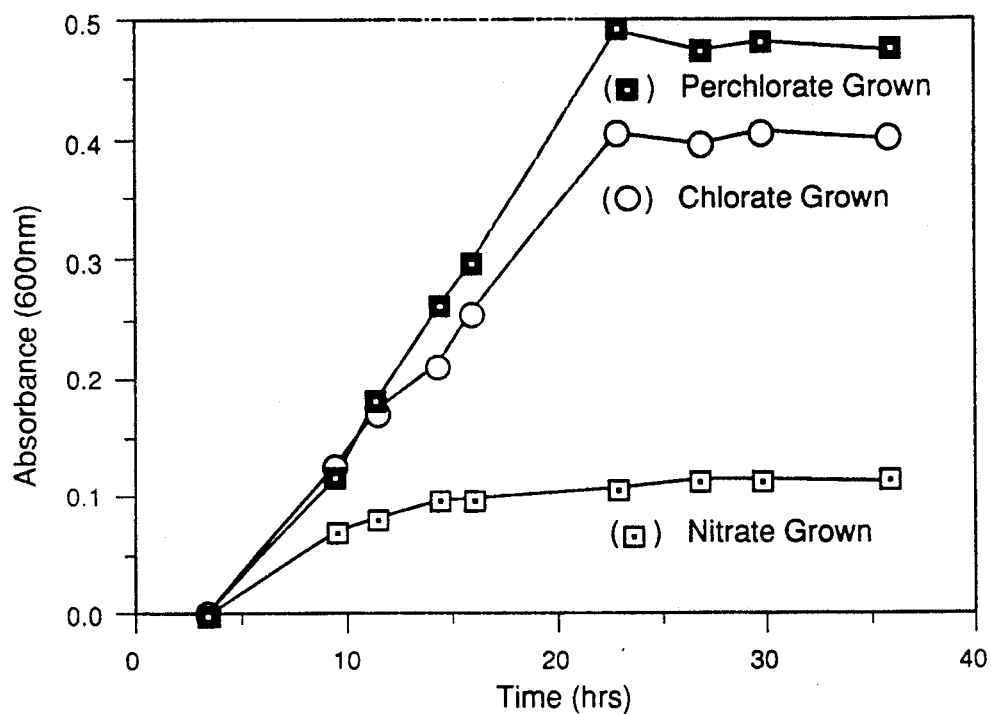
FIG. 1 is a graph of absorbance versus time showing HAP1 cell growth with either perchlorate, chlorate or nitrate as the terminal electron acceptor.
Figure 2:
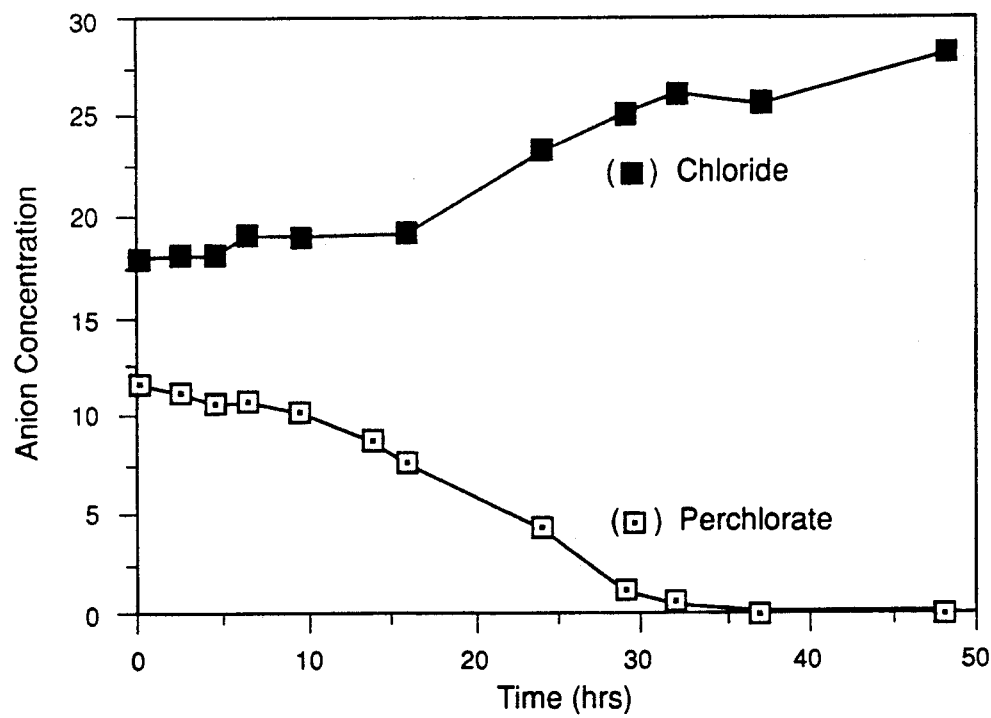
FIG. 2 is a graph of anion concentration versus time showing reduction of perchlorate stoichiometrically to chloride by HAP1.
Figure 3:
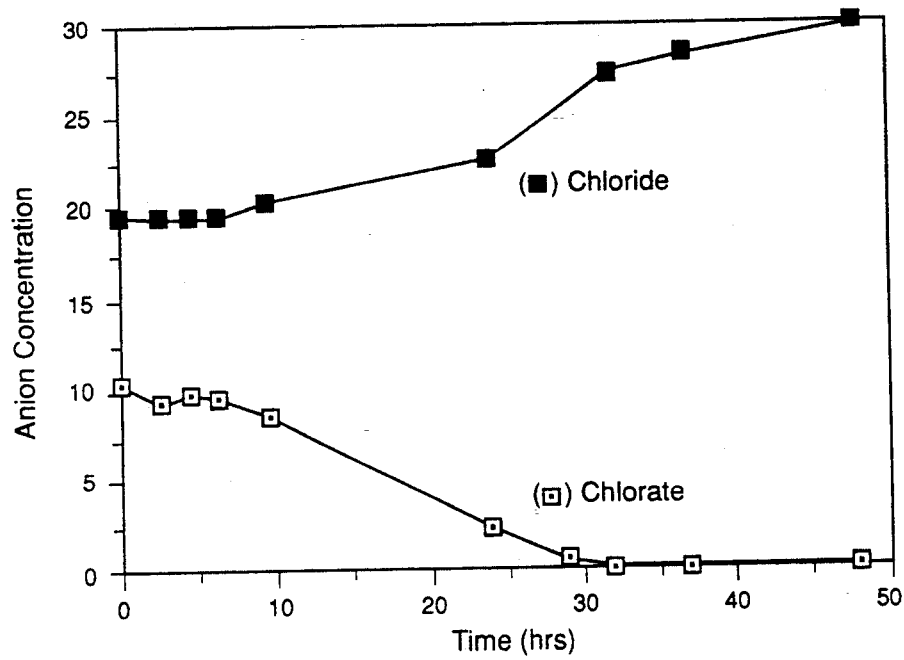
FIG. 3 is a graph of anion concentration versus time showing reduction of perchlorate intermediate, chlorate, stoichiometrically to chloride by HAP1.
Figure 4:
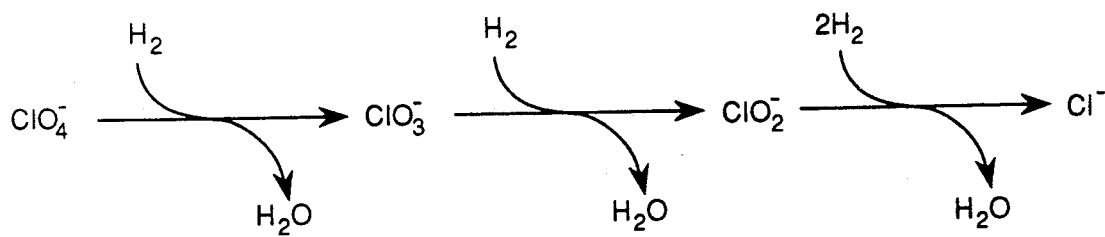
FIG. 4 is a drawing of the proposed metabolic pathway for perchlorate reduction by HAP1.

Referring now to the drawings, FIG. 1 is a graph of absorbance versus time showing HAP1 cell growth with perchlorate, chlorate and nitrate as the terminal electron acceptor. FIG. 1 shows HAP1 to characteristically exhibit greatest cell production when grown with perchlorate as electron acceptor, then chlorate and nitrate. FIGS. 2 and 3 respectively show that HAP1 reduces both perchlorate and the perchlorate intermediate chlorate stoichiometrically to chloride. HAP1 has the enzymatic capacity to reduce chlorite to chloride but does not exhibit growth with that compound. FIG. 4 shows the proposed metabolic pathway for perchlorate reduction by HAP1. HAP1 is capable of actively degrading perchlorate concentrations as high as 7750 ppm and survives concentrations as high as 30,000 ppm. When grown in pure culture, HAP1 has a specific degradation rate at or above 1492 mg/hr per gram dry biomass.

A purified culture of HAP1 was deposited with the American Type Culture Collection Patent Depository, 12301 Parklawn Drive, Rockville MD 20852. A purified culture of HAP1 and all mixed cultures associated with HAP1 are deposited at Armstrong Laboratory/EQ-OL, 139 Barnes Road, Bldg. 1117, Tyndall AFB FL 32403.

TABLE I

CHARACTERISTICS OF PERCHLORATE REDUCING BACTERIUM HAP1

SOURCE:

Municipal Anaerobic Digester

MORPHOLOGY:

Gram negative
Thin rod, approx 0.5 by 2-8 micrometers in size
Non-sporeforming
Highly motile
Colonies are clear, circular and mucoid

PHYSIOLOGY:

Strictly anaerobic
Catalase negative
Uses hydrogen or formate as reductant source
Reduces nitrate to nitrite but not to nitrogen gas
Grows at temperatures 20–42° C., optimum 40° C.
Grows at pH range 6.5–8.0, optimum 7.1
Excellent growth on agar media
Colonies oxidize resazurin dye to pink form when grown on perchlorate medium

ANTIBIOTIC RESISTANCE:

Carbenicillin sensitive
Streptomycin sensitive
Penicillin resistant
Chloramphenicol sensitive
Erythromycin sensitive
Tetracycline sensitive
Ampicillin sensitive
Neomycin resistant
Novobiocin resistant
Kanamycin sensitive
Rifampin resistant
Vancomycin resistant

TABLE II

CARBON SUBSTRATES UTILIZED BY HAP1

| Carbon Substrates | Growth with Hydrogen | Growth With Perchlorate and Hydrogen |
| --- | --- | --- |
| Glucose | No | No |
| Fructose | No | No |
| Galactose | No | No |
| Lactose | No | No |
| Sucrose | No | No |
| Starch | No | No |
| Acetate | No | Yes |
| Aspartate | Yes | Yes |
| Butyrate | No | No |
| Citrate | No | No |
| Formate | No | No |
| Fumarate | Yes | Yes |
| Lactate | No | Yes |
| Malate | Yes | Yes |
| Propionate | No | No |
| Pyruvate | No | Yes |
| Succinate | No | Yes |
| Ethanol | No | No |
| Methanol | No | No |
| 1-Propanol | No | No |
| Benzoate | No | No |
| Whey Powder | No | Yes |
| Peptone | No | Yes |
| Yeast Extract | No | Yes |
| Brewers Yeast | No | Yes |
| Casamino Acids | No | Yes |
| Cottonseed Protein | No | Yes |

TABLE III

ELECTRON ACCEPTORS TESTED FOR USE BY HAP1

| Compounds Tested | Terminal Electron Acceptor |
| --- | --- |
| Perchlorate | Yes |
| Chlorate | Yes |
| Chlorite | No |
| Nitrate | Yes |
| Nitrite | No |
| Sulfate | No |
| Sulfite | No |
| Thiosulfate | No |
| Iron Oxide | No |
| Manganese Dioxide | No |
| Magnesium Oxide | No |
| Fumarate | Yes |

THE REACTOR SYSTEM

Figure 5:
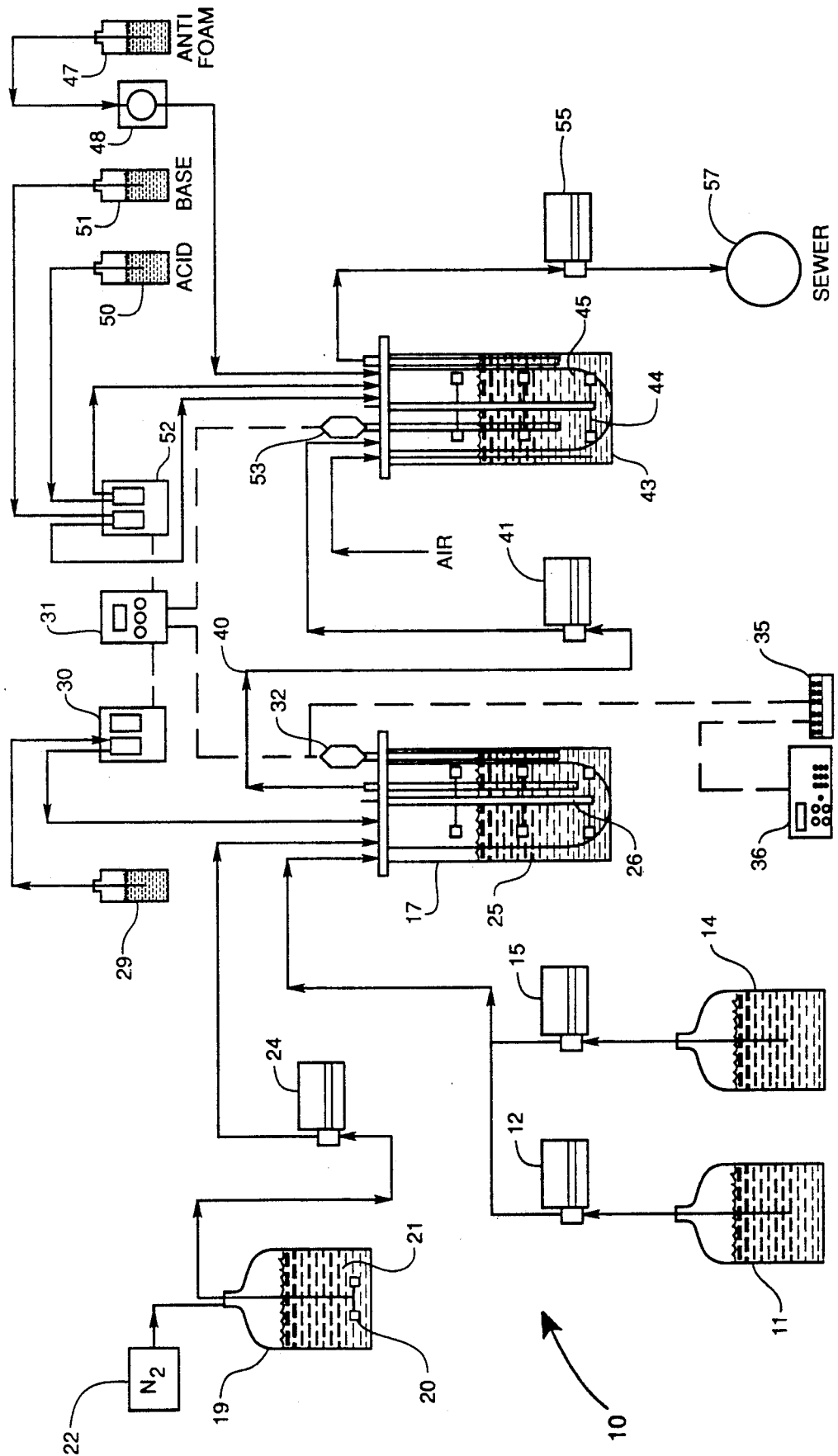
FIG. 5 shows a representative system utilizing HAP1 in a mixed culture to biotreat perchlorate contaminated wastewaters.

FIG. 5 illustrates a representative system 10 for practicing the invention. Wastewater generated by manufacture, maintenance, refurbishment and disposition of rocket motors containing ammonium perchlorate based solid propellant or from ammonium perchlorate production facilities, contaminated soil washings or other contaminated water sources may contain dissolved perchlorate salts in amounts up to about 12 weight per cent (wt %) (120 grams/liter (g/l)) and potentially trace quantities of nitro compounds such a nitroglycerine, nitrate esters, RDX, HMX and nitrocellulose. Perchlorate contaminated wastewater is fed from feed tank 11 through pump 12 and blended with dilution water from tank 14 through pump 15 to achieve an ammonium perchlorate concentration not to exceed 9 g/l and preferably less than about 7.0 g/l. The diluted wastewater solution is pumped to the anaerobic reactor 17. Solid high protein organic nutrients in the form of aged brewers yeast, cottonseed protein or whey powder have been shown to produce optimal perchlorate reduction and are mixed in water in slurry tank 19 by a slurry agitator 20. Organic nutrient concentration in tank 19 is normally at or below 10 wt % depending on the wastestream requirements. The organic slurry 21 is acidified to below pH 1.5 with hydrochloric acid and maintained under nitrogen gas 22 to prevent microbial growth prior to use. Slurry 21 is pumped to reactor 17 by pump 24 at a rate to produce a weight ratio of organic nutrients to perchlorate ion of 4:1 or higher. An option for use on small reactors 17 (less than 25 liter volume) is the replacement of tank 19, agitator 20 and pump 24 with a dry material screw feeder (such as AccuRate Dry Material Feeder, model 102) which would add dry organic nutrient directly to reactor 17 at a weight ratio of organic nutrients to perchlorate ion of 4:1 or higher. Inside reactor 17, perchlorate ion is reduced to chloride in the wastewater solution. Incoming liquid 25 to reactor 17 is mixed using motorized rotatable impeller 26. Reactor 17 is populated with HAP1 and microorganisms of a stable anaerobic microbial consortium from a sewage enrichment culture which are capable of fermenting the organic nutrient source. The consortium contains up to 10 undefined facultative anaerobic bacteria which remove oxygen, nitrate, nitrite, sulfate and sulfite from liquid 25 and provide biochemical reductants such as hydrogen and formate for HAP1 growth. HAP1 is the only organism in the culture which can reduce perchlorate to chloride. The undefined facultative anaerobes have no unique characteristics differentiating them from typical wastewater microorganisms and are readily obtained by one skilled in the art by enrichment on an appropriate organic nutrient. Their population composition is subject to fluctuation as reactor 17 is open to the environment and is not operated in a sterile manner. The biochemistry within reactor 17 excluding perchlorate reduction is best understood by reference to *Bacterial Metabolism*, G. Gottschalk, Chap 8, "Bacterial Fermentations", Springer-Verlag (1979); "Anaerobic Wastewater Treatment," *Advances in Biochemical Engineering/Biotechnology*, #29, Springer-Verlag, pp 83–115 (1984); and *Wastewater Engineering*, Metcalf & Eddy, Inc., McGraw-Hill Book Co., Chap 10 and 12 (1972), the entire teachings of which are incorporated here by reference. The mixed culture containing HAP1 is maintained by weekly transfers on the following medium: 6 g/l $K_2HPO_4$, 2 g/l $Na_2HPO_4$, 10 g/l Peptone, 10 g/l yeast extract, 1 g/l $NH_4CLO_4$ and 0.0001% resazurin. An active perchlorate reducing culture (10 vol %) is used to inoculate reactor 17. The anaerobic growth process produces organic acids which lower pH of mixture 25. The culture functions at pH 6.5–8.0 and 20°–42° C. (optimally about pH 7.1 and 40° C.) in a perchlorate concentration less than 8000 ppm. Since reduction of perchlorate ion occurs beneficially at pH 6.5–8.0, caustic 29 in the form of NaOH, KOH or the like is added to reactor 17 using pump 30 controlled by pH meter/controller 31 connected to pH/redox probe 32. Flow rates(s into and out of reactor 17 are adjusted to maintain a liquid retention time within reactor 17 of about 8–40 hours, dependent on perchlorate concentration. Anaerobic microbial growth on the nutrient maintains low reduction/oxidation potential (less than −300 mV) in reactor 17 for optimum performance. Redox potential is monitored by probe 32 through switchbox 35 and ion analyzer 36.

Liquid effluent 40 from reactor 17 is drained by transfer pump 41 into aerobic reactor 43 for reducing organic content of effluent 40. Effluent 40 flow rate into reactor 43 is maintained at a level consistent with maintaining a desired liquid resident time within reactor 17 as suggested above. Air is circulated through reactor 43 at a rate sufficient to not limit biological oxidation. Reactor 43 is stirred using rotatable impeller 44. To prevent excessive foaming from the aeration and mixing of liquid 45 in reactor 43, antifoam 47 is added as needed through pump 48. Within reactor 43 organics which were produced in reactor 17 are biologically converted to carbon dioxide and sludge. The chemistry within reactor 43 is best understood by reference to *Wastewater Engineering*, supra. The solution in reactor 43 is best maintained at about pH 7.0–8.5 (preferably about 7.0) and at about 32°–37° C. In order to maintain the desired pH, acid 50 in the form of HCl or base 51 in the form of NaOH or KOH may be added as needed using pump 52 controlled by meter/controller 31 connected to probe 53. Effluent from reactor 43 may be discharged using pump 55 and may be of sufficient quality for discharge directly to sanitary sewer 57. Sludge from reactor 43 comprising principally cell mass and undigested organic nutrient may be removed and disposed of by settling or filtration, drying and landfill.

EXAMPLE 1

A one-liter flask was filled with the 500 ml of the following medium: dipotassium phosphate 1 g/l, disodium phosphate 1.5 g/l, ammonium perchlorate 1.17 g/l, yeast extract 10 g/l, and bacto peptone 10 g/l. The pH was adjusted to 7.1 with 5N HCl. The medium was flushed with gas composed of 10% hydrogen, 10% carbon dioxide, 80% nitrogen to remove oxygen and then maintained under this gas. The medium was inoculated with one vol % of an active culture of HAP1 and incubated at 37° C. Following a lag period of approximately 4 hours perchlorate ion was reduced from 1000 ppm to less than 10 ppm at a rate of 1492 mg $ClO_4^-$/hr/gram dry biomass.

EXAMPLE 2

Figure 6:
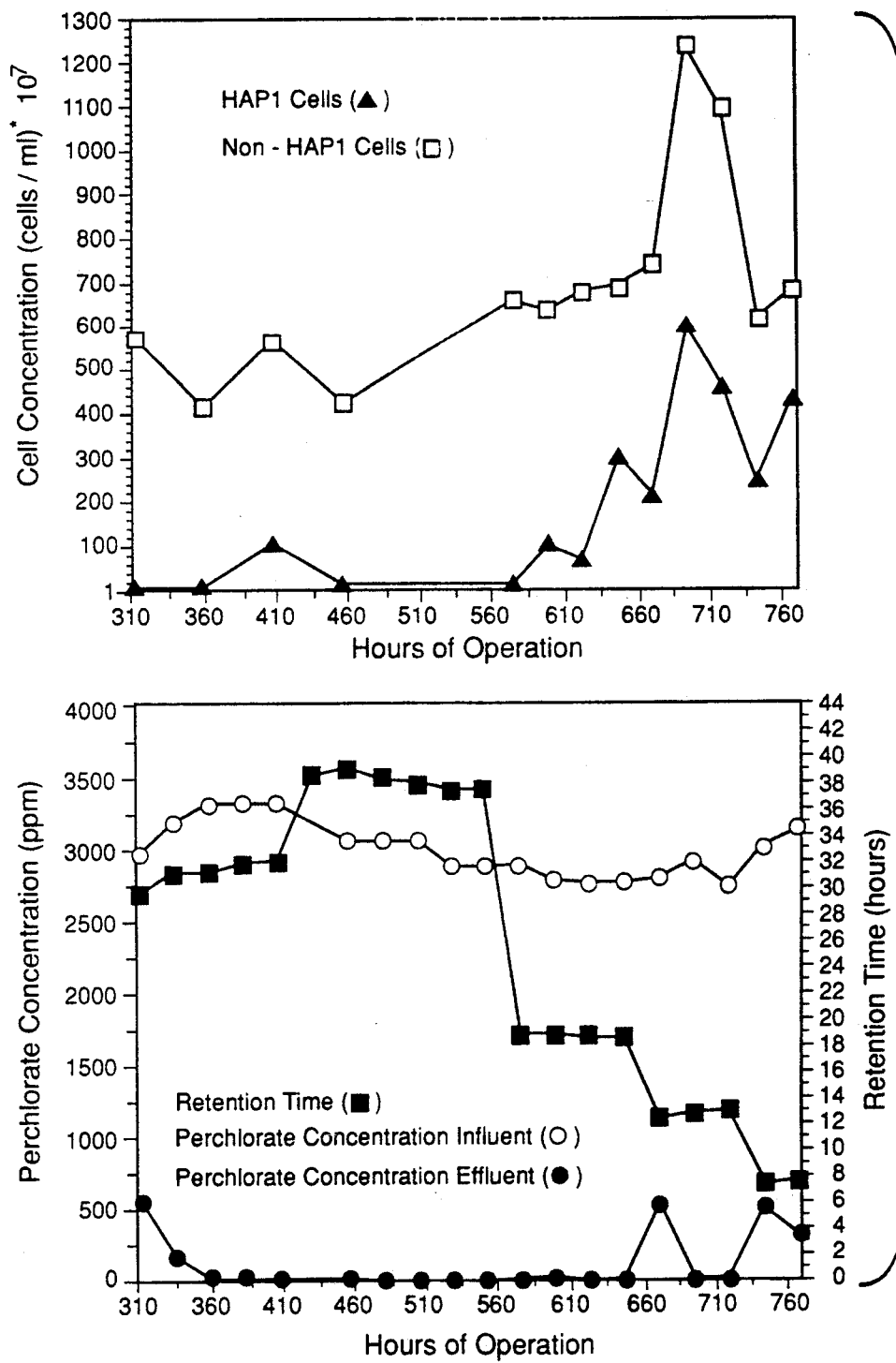
FIG. 6 is a graph of cell concentration and perchlorate concentration versus time showing operational data obtained from a typical application of the invention on rocket motor washwater containing ammonium perchlorate.

Descriptions herein refer to the FIG. 5 system with variations described. Ammonium perchlorate laden washout water from disposal of a class 1.3 rocket motor, containing approximately 15,000 ppm perchlorate ion, was placed in an empty tank 11. The washout water was mixed with dilution water from tank 14 through combined lines from pumps 12,24 to yield an approximate perchlorate concentration to reactor 17 (liquid working volume 10.8 liters) of 3000 ppm. Reactor 17 was populated with HAP1 and microorganisms of a stable anaerobic microbial consortium from a sewage enrichment culture which were capable of fermenting aged brewers yeast and which were present in total concentrations in excess of $1 \times 10^6$ cells/ml. HAP1 was the only organism present capable of reducing perchlorate. The growth nutrient, aged brewers yeast, was fed directly by a dry material screw feeder in place of nutrient tank 19. The average ratio of brewers yeast addition to perchlorate ion addition was 10:1. The combined liquid in reactor 17 was maintained at 40° C. during the test. The pH in combined liquid 25 was maintained at 7.1 by addition of 30 wt % NaOH through pump 30 which was regulated by controller 31 connected to probe 32. The redox of liquid 25 was monitored at or below $-300$ mv during the test to ensure optimum perchlorate reduction. FIG. 6 summarizes a portion of the performance of the system during the test as the liquid retention time was varied. The stepwise reduction of liquid retention times below approximately 18 hours required periods of acclimation before the perchlorate effluent fell below 10 ppm. An 8-hour liquid retention time was the minimum level beyond which perchlorate reduction was unstable. As the reactor liquid retention time was shortened, HAP1 population relative to other organisms within the mixed culture increased from approximately 0.2% to almost 50%. Continuous reactor 17 operation at a retention time of 12.5 hours resulted in a reduction of 2827 ppm perchlorate to less than 10 ppm at a reduction rate of 221 mg $ClO_4^-$.

Effluent 40 from reactor 17 was pumped to reactor 43 (liquid working volume 11 liters) using pump 41 for reducing organic content. Diffused air was pumped through liquid 45 at 6 liters per minute. Liquid 45 was stirred via impeller 44 at 400 rpm. The pH was maintained at 7.0 by addition of either 30% NaOH or 5N HCl through pump 52 which was regulated by controller 31 connected to probe 53. Organics which were generated from the dry nutrient feed were converted to carbon dioxide and sludge. The reduction of organics was monitored in terms of filtered chemical oxygen demand (COD) removal from the system. Typical removal efficiencies were in excess of 90% with feed COD concentrations averaging 30,000 mg/l. Further lowering of the COD effluent can be achieved by sizing reactor 43 to a larger scale to increase the retention time in accordance with prior art described in *Wastewater Engineering*. supra. Effluent from reactor 43 was collected for sludge separation and disposal.

The invention therefore provides an economical and environmentally safe method for treatment of wastewater containing dissolved solid propellant. It is understood that modifications to the invention may be made as might occur to one skilled in the field of the invention within the scope of the appended claims. All embodiments contemplated hereunder which achieve the objects of the invention have therefore not been shown in complete detail Other embodiments may be developed without departing from the spirit of the invention or from the scope of the appended claims.

We claim:

1. A method for treating wastewater to remove ammonium perchlorate dissolved therein, comprising the steps of:
    (a) providing a substantially closed anaerobic reactor having an inlet for inserting said wastewater thereinto and an outlet for discharge of effluent liquid therefrom, said anaerobic reactor being of preselected size to provide a preselected resident time of said wastewater therewithin at preselected flow rate therethrough;
    (b) providing a source of an organism from a sewage enrichment culture for reducing perchlorate ion in said wastewater to chloride ion;
    (c) adding said organism to said wastewater within said anaerobic reactor;
    (d) adjusting the pH of said wastewater within said anaerobic reactor to about 6.5 to 8.0;
    (e) discharging effluent liquid from said anaerobic reactor at a rate corresponding to said preselected resident time of said wastewater within said anaerobic reactor;
    (f) providing a substantially closed aerobic reactor having an inlet for inserting said effluent liquid thereinto and an outlet for discharge of treated liquid therefrom, said aerobic reactor being of preselected size to provide a preselected resident time of said effluent liquid therewithin at preselected flow rate therethrough;
    (g) circulating air into said aerobic reactor and into said effluent liquid therein to convert soluble organics contained within said effluent liquid to carbon dioxide and sludge;
    (h) adjusting the pH of said effluent liquid within said aerobic reactor to about 7.0 to 8.5; and
    (i) discharging treated liquid from said aerobic reactor.

2. The method of claim 1 wherein said organism comprises HAP1.

3. The method of claim 1 wherein said wastewater within said anaerobic reactor is diluted with dilution water to a concentration of ammonium perchlorate of less than about 7 grams per liter prior to adjusting the pH of said wastewater within said anaerobic reactor.

4. The method of claim 1 wherein the pH of said wastewater within said anaerobic reactor is adjusted to about 7.1.

5. The method of claim 1 wherein the step of adjusting the pH of said wastewater is performed by adding a caustic material selected from the group consisting of sodium hydroxide and potassium hydroxide.

6. The method of claim 1 wherein the temperature of said wastewater within said anaerobic reactor is maintained at about 40° C.

7. The method of claim 1 further comprising the step of adding growth nutrient to said wastewater within said anaerobic reactor.

8. The method of claim 7 wherein said growth nutrient is selected from the group consisting of dry brewers yeast, cottonseed protein and whey powder.

9. The method of claim 1 wherein the step of adjusting the pH of said effluent liquid is performed by adding an acid.

10. The method of claim 1 wherein the temperature of liquid within said aerobic reactor is maintained at 32° to 37° C.

11. A method for treating wastewater to remove ammonium perchlorate dissolved therein, comprising the steps of:
(a) diluting said wastewater with dilution water to a concentration of ammonium perchlorate in the diluted wastewater of less than about 9 grams per liter;
(b) providing a substantially closed anaerobic reactor having an inlet for inserting said diluted wastewater thereinto and an outlet for discharge of effluent wastewater therefrom, said anaerobic reactor being of preselected size to provide a preselected resident time of diluted wastewater therewithin at preselected flow rate therethrough;
(c) providing a source of an organism comprising HAP1 from a sewage enrichment culture for reducing perchlorate ion in said wastewater to chloride ion;
(d) adding said organism to said diluted wastewater within said anaerobic reactor;
(e) adding growth nutrient to said diluted wastewater within said anaerobic reactor for promoting growth and operation of said organism within said anaerobic reactor;
(f) adjusting the pH of said diluted wastewater within said anaerobic reactor to about 6.5 to 8.0;
(g) maintaining the temperature of said diluted wastewater within said anaerobic reactor at about 40° C.;
(h) discharging effluent wastewater from said anaerobic reactor at a rate corresponding to a resident time of said diluted wastewater within said anaerobic reactor of about 44 to 80 hours;
(i) providing a substantially closed aerobic reactor having an inlet for inserting said effluent wastewater thereinto and an outlet for discharge of treated wastewater therefrom, said aerobic reactor being of preselected size to provide a preselected resident time of said effluent wastewater therewithin at preselected flow rate therethrough;
(j) circulating air into said aerobic reactor and into said effluent wastewater therein to convert soluble organics contained in said effluent wastewater to carbon dioxide and sludge;
(k) adjusting the pH of said effluent wastewater within said aerobic reactor to about 7.0 to 8.5;
(l) maintaining the temperature of said effluent wastewater in said aerobic reactor at 32° to 37° C.; and
(m) discharging treated wastewater from said aerobic reactor.

12. The method of claim 11 wherein said growth nutrient is selected from the group consisting of dry brewers yeast, cottonseed protein and whey powder, and said growth nutrient is added to said wastewater in an amount equivalent to at least four times the weight of said dissolved perchlorate ion.

13. The method of claim 11 wherein the pH of said diluted wastewater within said anaerobic reactor is adjusted to about 7.1.

14. The method of claim 11 wherein the step of adjusting the pH of said diluted wastewater is performed by adding a caustic material selected from the group consisting of sodium hydroxide and potassium hydroxide.

15. The method of claim 11 wherein the step of adjusting the pH of said effluent wastewater within said aerobic reactor is performed by adding an acid.

* * * * *